United States Patent Office 3,431,114
Patented Mar. 4, 1969

3,431,114
PREPARATION OF BAKED LEAVENED
PRODUCTS
Meredith P. Sparks, 704 Highland Ave.,
Westfield, N.J. 07090
No Drawing. Filed Oct. 19, 1965, Ser. No. 498,129
U.S. Cl. 99—86                9 Claims
Int. Cl. A21d 13/08

ABSTRACT OF THE DISCLOSURE

Baked leavened products such as cake, cookies and the like are prepared using as the leavening agent halogenated hydrocarbons which are liquid at ambient temperatures and pressures, boiling within the range of about 25° C. to 100° C.

---

This invention relates to the production of baked raised products such as bread, cake, biscuits, cookies, doughnuts, griddle cakes, waffles, and the like. More particularly, it pertains to the use of halogenated hydrocarbons as leavening agents in the preparation of these baked products. Thus it represents a departure from leavening dough through the liberation of carbon dioxide, or by fermentation as with yeast.

According to my invention, baked goods can be prepared by leavening the dough with halogenated hydrocarbons prior to baking. The halogenated hydrocarbons useful for this purpose have low toxicity. They are also essentially chemically inert, non-flammable, and gaseous at the usual baking temperatures of 300° to 500° F. After vaporizing during the mixing or baking process they leave little or no residue so that the baked product is free of objectional taste or odor. They are also stable on storage.

The halogenated hydrocarbons which are suitable for use in ordinary dough and batter formulations are liquids at ambient temperatures and pressures, boiling in the range of about 25° to 100° C., and preferably in the range of 40° to 50° C. at atmospheric pressure. Halogenated hydrocarbons which are particularly suitable for this invention are methylene chloride (B.P. 40° C.), trifluorotrichloroethane (Freon-113), B.P. 47.6° C., dibromotetrafluoroethane (Freon-114B2), B.P. 47.3° C., trifluorobromochloroethane (Fluothane), B.P. 50° C., and mixtures thereof.

It is well know that the most common difficulty with baking powders is deterioration subsequent to packaging and prior to use. This deterioration may be due to different reasons, but is probably most often caused by absorption of atmospheric moisture. The products depend for their satisfactory action on solution together in water of the dry solid acid and the sodium bicarbonate.

The active ingredients of ordinary baking powders are sodium bicarbonate, and an acid salt. The various types of baking powders vary in the nature of the acid salts which react with the sodium bicarbonate in the presence of water to release carbon dioxide gas which leavens the dough or batter. The phosphate and tartrate salts are "fast acting," liberating the carbon dioxide at room temperature, so that baking must follow immediately. Sodium aluminum sulfate is "slow acting," liberating the carbon dioxide only at elevated temperatures during the baking process and are used when some time must elapse between mixing and baking. The "double acting" baking powders contain both types of ingredients.

It is an advantage of this invention that halogenated hydrocarbons can be selected by boiling points to be fast acting or slow acting according to the baking needs. Thus a lower boiling halogenated hydrocarbon can be used where circumstances favor fast acting leavening power; a higher boiling halogenated hydrocarbon can be used where slow action is preferred; and mixtures can also be used.

The halogenated hydrocarbons can be substituted for the baking powder or soda in the usual cook book or commercial recipes for preparing baked goods. Generally about 5 cc. to 10 cc. of the liquid halogenated hydrocarbon is substituted for one teaspoon of baking powder in the usual recipe. Ratios above and below these amounts can equally as well be employed but are ordinarily less preferred. The amount will vary somewhat with the particular halogenated hydrocarbon used. The high molecular weight compounds will generally require a greater amount than the low molecular weight compounds. The optimum amount for any particular recipe can be readily determined by one skilled in the art of baking.

The dough can be prepared according to the usual baking recipes. The halogenated hydrocarbon is added preferably to the liquid components of the baking recipe so as to insure more thorough mixing. It can also be added to a mixed batter just prior to baking.

The term "dough" is used throughout the specification and claims to mean any soft pastry mass suitable for baking which is made from wheat flour and water or an aqueous liquid such as milk, which dough may contain other food ingredients such as sugar, fats, eggs, or other ingredients which are commonly used in baking recipes. The term "fat" is used to include a liquid or solid fat, and also proprietary materials used as fats.

The baking time and temperature recommended in the cooking recipe is usually followed. However, it may be advantageous in a particular recipe to increase the temperature slightly, or to prolong the baking time, especially when using a higher boiling liquid as the leavening agent. If a crust forms which tends to cause retention of the gases, for example, in a muffin, biscuit or cupcake, small holes or slits may be made near the crust to permit any excess gases to escape immediately after baking, and before cooling.

It is a particular advantage of this invention that the halogenated hydrocarbons can be used as leavening agents for the production of dietary baked products which are free of sodium residue. Persons who are on a strict low-sodium diet must avoid not only the use of salt for seasoning, but also baked foods prepared with the ordinary baking powders which leave a sodium residue. Low sodium diets are indicated, for example, in the treatment of primary hypertension, toxemia of pregnancy, congestive heart failure, ascites, renal disease, or during treatment with certain corticosteroids.

Using halogenated hydrocarbons as the leavening agents baked products of high quality can be obtained. Little or no residual matter will be detected in the baked product. However, during the mixing and baking processes some of the halogenated hydrocarbons, especially methylene chloride, will serve as an antimold agent and may also act to decrease any ropiness which might otherwise arise later in the finished product.

The halogenated hydrocarbons of my invention have particular value as leavening agents for frozen doughs which are commonly sold for products such as biscuits, pizzas, muffins, cakes and coffee cakes. Quick freezing retards the leavening action almost completely and at the same time may act to protect the dough against spoilage. The dough can then be baked quickly after taking from the freezer so as to avoid escape of the leavening agent as a gas until the food is baked.

The dough may also be packaged as a pressurized, self-propelled composition in a pressure-tight container having a valve controlled opening, using liquefied-gas propellants which are halogenated hydrocarbons. In this instance the liquefied normally gaseous halogenated hydrocarbons serve both as a propellant and as the leavening agent. Accordingly, no baking powder or other gas producing agent will be necessary for leavening. As a result no sodium residues will be left in the baked product.

This method of packaging is particularly suitable for making griddle cakes, cookies, or biscuits where it is desired to bake only a few at one time. In a restaurant, speedy service can be obtained with a single order for griddle cakes, for example, by dispensing the griddle cake dough directly from the pressurized container onto a hot greased griddle. In a family where only one member is on a sodium-free diet, it is also an advantage to have a single serving readily available without separate mixing.

For this invention I employ a composition comprising (1) a dough suitable for baking purposes and (2) a highly volatile propellant. At least a substantial proportion of the propellant used in the mixture is insoluble in the dough and the two primary ingredients are maintained under sufficient pressure so that the insoluble portion of the propellant is in liquid phase. The dough is confined at the vapor pressure of the propellant in a pressure-tight container having an opening controlled by a suitable manually operable valve. When the valve is opened, the pressure on the composition is released as it emerges from the container, with the result that a leavened dough is produced. The action is apparently such that the volatile propellant liquid, entrapped within the dough, vaporizes upon the release of the pressure therefrom, forming fine gas cells throughout the dough.

Pressure tight containers of the type generally on the market, or simple adaptations thereof, can be used. Such containers are described by Kirk-Othmer, Encyclopedia of Chemical Technology, volume 1, second edition, on page 480 et seq. and in the references cited therein. A heavier batter will generally require a larger valve opening. The amount of material released with each act of opening can be held more or less constant by using a metered valve, which permits the escape of a limited and measured amount of a material and reseals automatically, regardless of the length of time that the finger is held on the actuator of the valve.

Suitable propellants include liquefied, normally gaseous, lower molecular weight halogenated hydrocarbons, such as halogenated methane, ethane, propane, butane and cyclobutane, and mixtures thereof. Satisfactory products result from the use of such materials in view of their high volatility under usual atmospheric conditions, and their stability in and dispersibility with doughs suitable for baking. In some instances it may be desirable to use a combination of two or more of the liquefied, normally gaseous, materials as a propellant in order to achieve a suitable pressure within the container and impart the desired properties of stability, propellancy and ease of delivery to the dough composition.

The gaseous halogenated hydrocarbons have the advantage over the liquid halogenated hydrocarbons for leavening doughs for baking purposes that there is no tendency for any gas which has not escaped during the baking to condense as a liquid when the baked product cools, thus resulting in an unwanted residue, or a soggy food product.

Particularly useful halogenated hydrocarbons for this purpose include dichlorodifluoromethane (Freon-12), 1-chlorodifluoro-2-trifluoroethane (Freon-115), chlorodifluoromethane (Freon-22), a mixture of 48.8% by weight of Freon-12 and 51.2% by weight of Freon-115 which is known as Freon-502, octafluorocyclobutane (Freon C-318), decafluorobutane (Freon - 318), dichlorofluoromethane (Freon-21), trichlorofluoromethane (Freon-11), and mixtures thereof. The approximate vapor pressures of these compounds at 32° F. and at 70° F. is:

|  | 32° F. | 72° F. |
|---|---|---|
| Freon-502 | [1] 62 | [1] 150 |
| Freon-22 | [1] 55 | [1] 130 |
| Freon-115 | [1] 50 | [1] 110 |
| Freon-12 | [1] 30 | [1] 70 |
| Freon-C 318 | [1] 3 | [1] 25 |
| Freon-114 | [2] 5 | [1] 12 |
| Freon-21 | [2] 10 | [2] 8 |
| Freon-11 | [2] 18 | [2] 2 |

[1] Gauge pressure, p.s.i.g.
[2] Vacuum, inches of mercury.

Vapor pressures are employed within the range of 5 to about 300 pounds per square inch gauge at a temperature within the range of about 32° to 72° F. The preferred pressure will vary somewhat with the viscosity and density of the dough, as well as upon the degree of leavening desired. The preferred vapor pressure will also vary with whether the product is to be dispensed at refrigerator temperature or at room temperature. To insure that the dough will be expelled from the container, the vapor pressure of the propellant must ordinarily be greater than about 15 pounds per square inch gauge at the temperature employed. When slightly higher vapor pressures are used, the composition emerges as a batter which later swells. It is generally preferred to use a propellant having a vapor pressure which will give a substantially fully leavened dough when it is released from the container. The upper limit of the vapor pressure for the propellant is not critical, but is determined by considerations of safety and economy. A preferred practical range is from 5 to 80 pounds per square inch gauge. It will be noted from the above table that Freon-12 has a vapor pressure within this range from 32° F. (slightly below refrigerator temperature) up to 72° F. (room temperature). If the dough is to be dispensed at refrigerator temperature, Freon-115, Freon-22, Freon-502, or mixtures of these with each other or with Freon-12 may also be employed. If the dough is to be dispensed at room temperatures, Freon-C-318 or Freon-114 can also be used; or a reduced vapor pressure may be obtained by using a mixture of Freon-12 with Freon-11 or Freon-21. The combined vapor pressure of the components of a mixture may not always be ascertained from a knowledge of the vapor pressure of the separate ingredients. The propellant may be formed of a mixture of two or more halogenated hydrocarbons which, although the individual ingredients may have vapor pressures outside the desired range have, when combined, a vapor pressure within the range.

When halogenated hydrocarbons are used as propellants which operate by vapor pressure the force available, while temperature-sensitive, is essentially independent of the amount of propellant in the container. The container is generally filled about 80% full.

The amount of the propellant varies from 5% to about 12% by weight of the total weight of the composition in the container, including the weight of the propellant and the dough.

The composition may be packaged in any suitable manner. One satisfactory method is to prepare the dough and add it to the pressure-tight container. Thereafter, the propellant while under pressure is admitted to the container through a valve or other appropriate means, the container generally being chilled below the usual refrigerator temperature during this operation. The chilling permits the container to be charged under conditions providing a greater available propelling pressure when the container regains refrigerator or atmospheric temperature. The composition is mixed in the container by agitation, as by simple shaking, and the container is then sealed.

Another satisfactory method is to pre-chill the dough and the propellant, either individually or as a mixture below the boiling point of the propellant, and charge them into the container which is sealed thereafter. The propellant can be dispensed with the dough by agitation before sealing, or prior to dispensing the contents.

Generally the packaged composition will be kept in a refrigerator until it is used. The contents are then dispensed at refrigerator temperature, or after standing so as to come to room temperature. It is an advantage of this invention that the dough may be dispensed through a manually operated valve directly onto the griddle or baking sheet, or in the container to be used for baking, thus saving mixing time, and avoiding dishwashing operations which would otherwise be necessary.

The following examples will serve to illustrate some of the mixtures or methods to which my invention is applicable. The detailed description has been given only for clearness of understanding as modifications will be obvious to those skilled in the art. A reasonable variation can be made in the relative proportions of the components of a mix.

Salt has been omitted from the recipes since this invention is particularly intended for preparing baked products for persons on non-sodium diets. Salt or other condiments can of course, be added to suit the taste. Also it is common practice to add various adjuvant materials to baking recipes. For example, the Hood Basic Cook Book (Riverside Press, Cambridge, Mass.) on pages 491-2, first gives a basic formula for plain dropped cookies; the recipe then describes minor adjustments in the formula to make spice cookies, brown sugar cookies, orange cookies, cocoanut cookies, raisin cookies, nut cookies and chocolate cookies. The specific examples are illustrative of the nature of the present invention, but it is to be understood that the invention is not limited thereto.

Example 1.—Coffee Cake

| | |
|---|---|
| 1 egg | 1 cup flour |
| ½ cup milk | 10 cc. methylene chloride |
| 2 tablespoons vegetable oil | ½ teaspoon vanilla |
| ½ cup sugar | |

Heat oven to 375° F. Grease an 8" square pan. Beat egg and milk together. Add oil. Add methylene chloride. Blend dry ingredients together and stir in. Mix with fork until thoroughly blended. Pour into prepared pan and bake for 30 minutes at 375° F.

Example 2.—Coffee Cake

| | |
|---|---|
| 1 egg | 1 cup flour |
| ½ cup milk | 12 cc. trifluorotrichloro- |
| 2 tablespoons vegetable oil | ethane |
| ½ cup sugar | ½ teaspoon vanilla |

Heat oven to 375° F. Grease an 8" square pan. Beat egg and milk together. Add oil. Add trifluorotrichloroethane. Blend dry ingredients together and stir in. Mix with fork until thoroughly blended. Pour into prepared pan and bake for 35 minutes at 375° F.

Example 3.—Plain Dropped Cookies

| | |
|---|---|
| ½ cup butter | ½ teaspoon vanilla |
| 1 cup sugar | 4 tablespoons milk |
| 1 egg unbeaten | 15 cc. methylene chloride |
| 2 cups flour | |

Let the fat stand in a mixing bowl until soft. Add the sugar, egg and vanilla and mix thoroughly. Add the methylene chloride to the milk. Stir the flour and the milk plus methylene chloride mixture alternately into the mixture in the bowl. Push from a teaspoon to a well-greased sheet. Bake at 375–400° F. until brown.

In the above recipe 15 cc. of dibromotetrafluoroethane or trifluorobromochloroethane may be substituted for methylene chloride.

Example 4.—Oatmeal Cookies

| | |
|---|---|
| 1 cup brown sugar | 1 egg |
| ½ cup butter | 1 tablespoon milk |
| 1 cup flour | 10 cc. methylene chloride |
| 1 cup uncooked oats | ½ teaspoon vanilla |

Stir brown sugar, butter, egg, vanilla; then add methylene chloride. Add the flour and oats all at once. Drop from teaspoon onto greased sheet. Bake 15 minutes at 350° F.

Example 5.—Doughnuts

| | |
|---|---|
| 2½ cups flour | 1 egg |
| ¼ teaspoon cinnamon | ½ cup milk |
| 1 tablespoon melted fat | 10 cc. methylene chloride |
| ½ cup sugar | |

Sift the flour with the cinnamon. Mix the fat, sugar and unbeaten egg in a mixing bowl. Add the methylene chloride to the milk. Stir in the dry ingredients and milk alternately. Turn the mixture onto a floured board. Roll ½" thick and cut with a doughnut cutter. Cook in fat heated to 335–365° F.

Example 6.—Midget Biscuits

| | |
|---|---|
| 1 cup flour | ⅜ cup milk |
| 2½ tablespoons shortening | 10 cc. methylene chloride |
| 1 teaspoon sugar | |

Work the shortening into the flour until the consistency of coarse corn meal. Moisten with the milk to which has been added the methylene chloride and stir. Push from a teaspoon to a well-greased sheet and bake at 400° F. for about 12 minutes.

Example 7.—Griddlecakes

| | |
|---|---|
| 1½ cups flour | 1 cup milk |
| 1 tablespoon sugar | 2 tablespoons vegetable oil |
| 1 egg, beaten | |

Sift together the dry ingredients. Combine the egg, milk and fat, and gradually add to the dry ingredients. Stir only until the batter is smooth.

The batter (185 grams) is weighed into an open, inverted pressure container, and the contents are cooled by suitable means to a temperature of −5° F. Fifteen grams of cooled and liquefied dichlorodifluoromethane (Freon 12) is then added to the contents and mixed by agitation. After the contents of the container have warmed up to refrigerator temperature (or room temperature) it is ready to be dispensed through a manually operated valve. The dough is dispensed directly onto a hot greased griddle. It is cooked slowly, turned, and then cooked on the reverse side.

The foregoing examples illustrate embodiments of my invention, but the invention is not limited thereto. It will be understood that many modifications, changes and substitutions may be made therein without departing from the true scope of the invention as defined in the appended claims.

I claim:
1. A method for preparing baked leavened products which comprises mixing at atmospheric pressure in an open vessel (1) a flour based food formulation for baked goods containing no carbon dioxide evolving ingredient, and (2) as the sole leavening agent, one or more liquid halogenated hydrocarbons having a boiling point at atmospheric pressure within the range of 25° C. and 100° C. in an amount sufficient to act as a leaven therefor, and then baking the resulting product, said halogenated hydrocarbon having a low toxicity, and being essentially chemically inert, nonflammable and gaseous at the baking temperature employed.

2. The process of claim 1 wherein said halogenated hydrocarbon is methylene chloride.

3. The process of claim 1 wherein said halogenated hydrocarbon is trifluorotrichloroethane.

4. The process of claim 1 wherein said halogenated hydrocarbon is dibromotetrafluoroethane.

5. The process of claim 1 wherein said halogenated hydrocarbon is trifluorobromochloroethane.

6. The method of claim 1 wherein the amount of said halogenated hydrocarbon is within the range of 4 cc. to 12 cc. per cup of flour in the food formulation.

7. The process of claim 1 wherein said halogenated hydrocarbon is mixed with said food formulation just prior to baking.

8. The process of claim 1 wherein said halogenated hydrocarbon is added to a mixture of the liquid components of the food formulation prior to adding the dry ingredients.

9. The process of claim 1 wherein said mixed food formulation is stored in a freezer until time for baking.

References Cited

UNITED STATES PATENTS

| | | | |
|---|---|---|---|
| 2,849,323 | 8/1958 | Young | 99—189 |
| 2,870,026 | 1/1959 | Keller et al. | 99—192 |
| 2,982,662 | 5/1961 | Cochran et al. | 99—192 |
| 3,021,220 | 2/1962 | Going et al. | 99—92 |
| 3,072,487 | 1/1963 | Webster | 99—60 |
| 3,222,189 | 12/1965 | Perrozzi | 99—172 |

RAYMOND N. JONES, *Primary Examiner.*

U.S. Cl. X.R.

99—90, 92, 95, 189, 192